Oct. 27, 1931.  L. RIBERA  1,829,671

DISPENSER

Filed Feb. 28, 1931

LUCIEN RIBERA
INVENTOR

BY *Victor J. Evans & Co.*
ATTORNEY

WITNESS:
*H. Frank*

Patented Oct. 27, 1931

1,829,671

UNITED STATES PATENT OFFICE

LUCIEN RIBERA, OF NEW YORK, N. Y.

DISPENSER

Application filed February 28, 1931. Serial No. 519,183.

This invention relates to dispensers, and more particularly to an article of this character adapted for use with bottles, holders, and other containers for sugar, tea, or other staple articles, whereby a measured amount of the goods may be dispensed.

The primary object of the invention is to equip a bottle or holder with a dispensing nozzle adapted to normally close the top of the bottle to keep the same sanitary, and which is also adapted to measure out a fixed amount of the contents of the bottle or holder.

Still another object of the invention is to equip a vessel or holder with a dispensing attachment adapted to measure out a specified amount of the contents when the vessel is tilted, and to retain the measured amount of the contents in a suitable compartment when the vessel is tilted back toward its normal vertical position, the nozzle having a pivoted cover for the measured contents compartment, this cover being equipped with a conveniently accessible handle member for use in opening the cover.

Other objects and advantages of the invention will be hereinafter specifically pointed out, or will become apparent, as the specification proceeds.

With the above indicated objects in view, the invention resides in certain novel constructions and combinations and arrangement of parts, clearly described in the following specification and fully illustrated in the accompanying drawings, which latter shows an embodiment of the invention as at present preferred.

Figure 1:
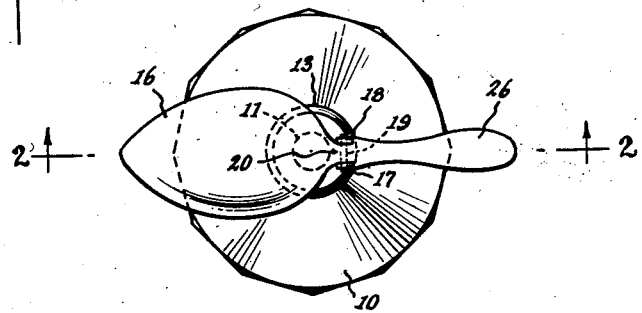
Fig. 1 is a top plan view of a vessel having the present dispensing nozzle applied thereto.
Figure 2:
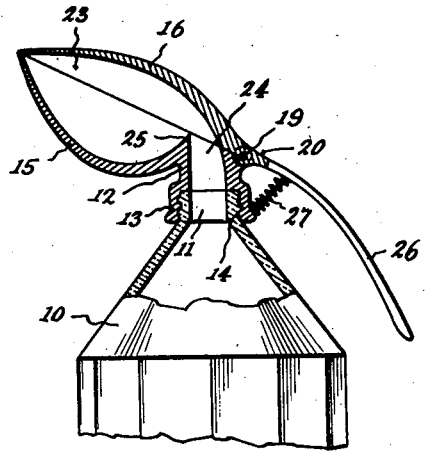
Fig. 2 is a side elevation, partly in section, illustrating the construction of the dispensing nozzle.
Figure 3:
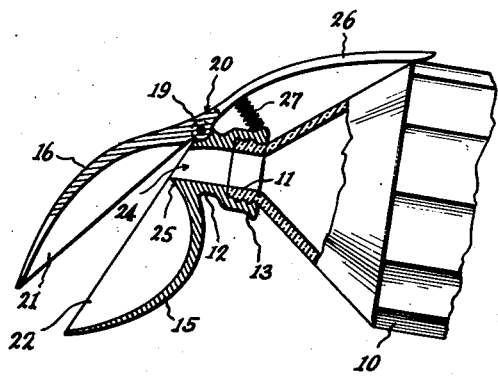
Fig. 3 is a view similar to Fig. 2 showing the vessel and nozzle in dispensing position.

The invention is here shown in connection with a vessel 10 of the type particularly adapted for dispensing sugar and the like. This vessel 10 includes a narrow neck portion 11.

The dispensing nozzle in this instance includes a body portion 12 having an internally threaded base 13 adapted to be screwed onto the threaded portion 14 of the neck 11. The body portion 12 extends vertically upward from the threaded base 13, and at one side this body portion 12 is formed with an integral upwardly inclined spoon-shaped portion 15. A complementary cover member 16 is pivotally mounted at the rear of the body portion 12, the body portion 12 having a pair of upstanding ears 17 and 18, and a pin 19 being passed through the ears 17 and 18 and through the neck portion 20 of the cover member 16 which is positioned between the ears. The cover member is substantially spoon-shaped or concave and has a continuous lower rim 21 adapted to meet flush against the continuous upper rim 22 of the spoon-shaped or dished member 15. A compartment 23 is thus formed between the members 15 and 16; and this compartment 23 has communication with the interior of the vessel 10 through a neck portion 24 formed between the rear wall 25 of the spoon-shaped member 15 and the rearward inner sides of the spoon-shaped cover member 16 and body portion 12.

Means are provided to open and close the cover member 16. For this purpose the cover 16 is provided with an integral handle portion 26 which extends downwardly at an inclination toward the side of the vessel 10 in such relation to the vessel 10 that the handle 26 is conveniently graspable by the user by the same hand, or one or more of the fingers thereof, that lifts the vessel. Movement of the handle 26 toward the vessel will swing the cover 16 about the pivot pin 19. A compression spring 27 is provided between the handle portion 26 and the lower part of the enlarged diameter neck portion 13 to urge the cover 16 in its closing direction and to normally hold the cover in its closed position.

In the use of the device the vessel is tilted to permit the contents to enter the compartment 23 through the neck portion 24. This tilting will fill the compartment 23 with contents of the vessel. The vessel is then tilted backward toward its vertical position though not necessarily exactly vertical, whereupon the excess amount of the contents which is incapable of being retained within the spoon-shaped member 15 when the cover 16 is opened, will find its way back within the vessel through the neck portion 24. The handle 26 is then manipulated to open the cover 16, and the contents of the spoon-shaped member 15 are dispensed in a well understood manner.

The contents of the vessel 10 may of course be dispensed by continuous pouring if desired, by simply holding the handle member 26 against the side of the vessel 10 during the pouring.

The present device is extremely practical and economical, particularly for use in eating places, the nozzle being adapted to dispense a fixed measured amount of the contents in each operation. Each spoon-full, so-called, requires a separate operation on the part of the user, so that there is not the same temptation to dispense an excessive amount of the contents as exists with dispensers that operate by continuous pouring of the contents.

Considerable particularities of description, as to materials, part details, dimensions, capacities and utilities may have been herein indulged in, but it will be understood that these statements, made with particular reference to that one, and the one now preferred of the many possible embodiments of the invention which is illustrated in the drawings, are not in any way to be taken as definitive or limitative of the invention. Inasmuch as many changes could be made in the above constructions, and many apparently widely different embodiments of the invention could be made without departing from the scope thereof, it is intended that all matter contained in the above description or shown in the accompanying drawings shall be interpreted as illustrative and not in a limiting sense.

It is also to be understood that the language contained in the following claims is intended to cover all the generic and specific features of the invention herein described, and all statements of the scope of the invention which, as a matter of language, might be said to fall therebetween.

In other words, the scope of protection contemplated is to be taken solely from the appended claims, interpreted as broadly as is consistent with the prior art.

What is claimed as new is:

1. A dispensing device including the combination with a vessel having a neck portion, of a nozzle body secured to said vessel neck, said nozzle body having an upwardly inclined spoon shaped portion, a complementary cover for said upwardly inclined spoon shaped portion, said cover member being pivotally mounted on said nozzle body, said nozzle body having a passage affording communication between the interior of the vessel and the interior of said complementary spoon shaped portion and cover, whereby to permit contents of said vessel to enter said spoon shaped portion when said vessel is tilted, means to normally hold said cover closed, and a handle on said cover for opening the latter to dispense the contents of said spoon shaped portion.

2. A dispensing device including the combination with a vessel having a neck, of a nozzle body secured to said vessel neck, said nozzle body having an inclined receptacle portion, a complementary cover for said inclined receptacle portion, said cover member being pivotally mounted on said nozzle body, said nozzle body having a passage affording communication between the interior of the vessel and the interior of said complementary receptacle portion and cover, whereby to permit contents of said vessel to enter said receptacle portion when said vessel is titled, means to normally hold said cover closed, a handle for said cover, said receptacle portion having an upwardly extending rear wall to retain the major part of the contents of said receptacle portion when the vessel is returned to a substantially vertical position.

3. A dispensing device including the combination with a vessel having a neck portion, of a nozzle body having a base screw threaded on said vessel neck, said nozzle body having an integral upwardly inclined spoon shaped portion, a complementary spoon shaped cover for said upwardly inclined spoon shaped portion, said cover member being pivotally mounted on said nozzle body, said nozzle body having a passage affording communication between the interior of the vessel and the interior of said complementary spoon shaped portion and cover, whereby to permit contents of said vessel to enter said spoon shaped portion when said vessel is titled, spring means to normally hold said cover closed, and a downwardly inclined elongated handle integral with said cover for opening said cover to dispense the contents of said spoon shaped portion.

4. A dispensing device including the combination with a vessel having a neck portion, of a nozzle body having a base screw threaded on said vessel neck, said nozzle body having an integral upwardly inclined spoon shaped portion, a complementary spoon shaped cover for said upwardly inclined spoon shaped portion, said nozzle body having a pair of upturned ears and said cover member being pivotally mounted between said ears, said nozzle body having a passage affording communication between the interior of the vessel and the interior of said complementary spoon shaped portion and cover, whereby to permit contents of said vessel to enter said spoon shaped portion when said vessel is tilted, spring means to normally hold said cover closed, a downwardly inclined elongated handle integral with said cover, said spoon shaped portion having an upwardly extending rear wall to retain the major part of the contents of said lower spoon shaped portion when the vessel is returned to a substantially vertical position.

In testimony whereof I hereby affix my signature.

LUCIEN RIBERA.